United States Patent [19]

Sakurai et al.

[11] Patent Number: 5,206,567
[45] Date of Patent: Apr. 27, 1993

[54] APPARATUS FOR RELIABLY ACTIVATING SENSORLESS AND BRUSHLESS DC MOTOR

[75] Inventors: Tetsuji Sakurai; Hideo Masaki; Katsuhiko Kaida, all of Tokyo, Japan

[73] Assignee: Kabushiki Kaisha Toshiba, Kawasaki, Japan

[21] Appl. No.: 750,413

[22] Filed: Aug. 27, 1991

[30] Foreign Application Priority Data

Aug. 28, 1990 [JP] Japan .................................. 2-224195
Aug. 28, 1990 [JP] Japan .................................. 2-224196

[51] Int. Cl.⁵ ............................................. H02P 7/00
[52] U.S. Cl. ..................................... 312/254; 318/439
[58] Field of Search ............... 318/138, 254, 271, 439, 318/759–812

[56] References Cited

U.S. PATENT DOCUMENTS

| | | | |
|---|---|---|---|
| 3,845,371 | 10/1974 | Grinnell, Jr. .......................... | 318/271 |
| 4,678,973 | 7/1987 | Elliott et al. .......................... | 318/254 |
| 4,814,676 | 3/1989 | Van Hoat ............................ | 318/254 |
| 4,874,993 | 10/1989 | Tanaka et al. ....................... | 318/254 |
| 4,896,089 | 1/1990 | Kliman et al. ................... | 318/254 X |
| 4,958,118 | 9/1990 | Pottebaum ...................... | 318/799 X |
| 4,988,939 | 1/1991 | Reichard et al. ................... | 318/800 |

Primary Examiner—Jonathan Wysocki
Attorney, Agent, or Firm—Finnegan, Henderson, Farabow, Garrett & Dunner

[57] ABSTRACT

When a sensorless and brushless DC motor is started, the rotor having a magnet is positioned by first exciting one pair of motor coils and then exciting another pair motor coils. The excitation of the motor coils is repeated until the rotor stops vibrating. Further, the positions of the magnetic poles of the rotor are detected by comparing the back electromotive force produced in each motor coil with the voltage generated in common to all motor coils. The rotation speed of the rotor is acquired from both the positions of the magnetic poles and the one cycle period of a signal representing the position of the rotor. A suitable delay time corresponding to the acquired rotation speed is determined, and the excitation phases are switched in accordance with the suitable delay time.

9 Claims, 7 Drawing Sheets

APPARATUS FOR RELIABLY ACTIVATING SENSORLESS AND BRUSHLESS DC MOTOR

BACKGROUND OF THE INVENTION

1. Field of the Invention

The present invention relates to a sensorless and brushless DC motor control apparatus.

2. Description of the Related Art

A brushless DC motor, for example, a spindle motor is incorporated in a magnetic disk apparatus so as to rotate a magnetic recording medium. The brushless DC motor comprises a Hall element which constitutes a position sensor (i.e., a Hall sensor), and the magnetic pole of the rotor having a magnet is detected by the Hall sensor. If the brushless DC motor is stationary (i.e., if the rotor is not rotated), the position of the magnetic pole of the rotor can be detected by the Hall sensor. When the brushless DC motor is driven, the motor coils to which a current is supplied are determined in accordance with the position of the magnetic pole of the rotor, so that the brushless DC motor can be driven normally.

In recent years, a sensorless and brushless DC motor not having a sensor has been employed so as to minimize the size of the magnetic disk apparatus. However, when the sensorless and brushless DC motor is stationary (i.e., when the rotor is not rotated), the position of the magnetic pole of the rotor cannot be detected. Therefore, a current is first supplied to desired motor coils, for the detection of the position of the magnetic pole of the rotor, and then normal driving control is performed.

If, as in the conventional technique, at the time of starting the sensorless and brushless DC motor, a current is supplied to desired motor coils, that is, desired phases are excited, the rotor will be rotated in the direction opposite to the desired direction, depending upon the position of the magnetic pole of the rotor. In this case, the rotor may continue to rotate in that opposite direction unless the excitation phases are switched at appropriate timings. In addition, the rotor may not rotate in one direction only, depending upon the position at which the magnetic pole of the rotor is located at the time of starting the sensorless and brushless DC motor. Thus, the rotation of the rotor cannot be controlled stably.

As mentioned above, the position of the magnetic pole of the rotor cannot be detected when the sensorless and brushless DC motor is stationary. Therefore, a rotor position signal is produced by the comparison between the back electromotive force of each motor coil and the voltage applied to the terminal used in common to all motor coils, and the switching timing of the excitation phases are determined in accordance with the rotor position signal. The excitation phases have to be switched, after the lapse of a predetermined time from a variation in the level of the rotor position signal. The suitable delay time is, for example, the time corresponding to a phase lag of 30°, i.e., the time corresponding to 1/12 of one revolution of the rotor. Therefore, the delay time has to be changed in accordance with the rotating speed of the rotor. In the conventional technique, this delay time is regulated by a delay circuit. With the delay circuit, however, it is difficult to change the delay time at the plurality of stages in accordance with the acceleration of the rotor. Since, therefore, the rotor cannot be accelerated with high efficiency, it requires a long time before the rotation of the rotor becomes constant.

Under these circumstances, there has been a demand for a sensorless and brushless DC motor control apparatus which enables a sensorless and brushless DC motor to be driven reliably and stably and which can control the acceleration of the rotor with high efficiency, thereby shortening the time required from the start of the rotor to the achievement of the constant rotation of the rotor.

SUMMARY OF THE INVENTION

It is an object of the present invention to provide a sensorless and brushless DC motor control apparatus.

According to the one aspect of the present invention, there is provided a sensorless and brushless DC motor control apparatus comprising: a sensorless and brushless DC motor having a rotor and a plurality of coils, the rotor having a plurality of magnetic pole positions; excitation means for exciting the plurality of coils to rotate the rotor; detection means for detecting the magnetic pole positions of the rotor from a back electromotive force produced in the excited coils; and control means for controlling the excitation means in accordance with the detected magnetic pole positions, and wherein in start of the sensorless and brushless DC motor, before desired coils of the plurality of coils are excited to position the magnetic pole positions in the desired coils, coils without the desired coils are excited, and the control means determines whether or not the rotor vibrates in accordance with the detected magnetic pole positions when the rotor starts to rotate and controls the excitation means to rotate the rotor at a constant speed when the rotor does not vibrate.

According to another aspect of the present invention, there is provided a sensorless and brushless DC motor control apparatus comprising: a sensorless and brushless DC motor having a rotor and a plurality of coils, the rotor having a plurality of magnetic pole positions; excitation means for exciting the plurality of coils to rotate the rotor; detection means for detecting the magnetic pole positions of the rotor from a back electromotive force produced in the excited coils; and control means for computing a rotation speed of the rotor from a detected result and controlling excitation timing of coils to be excited in accordance with the detected magnetic pole positions and the computed rotation speed of the rotor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE EMBODIMENTS

A description will now be given of one embodiment of the present invention, with reference to the accompanying drawings.

Figure 1:
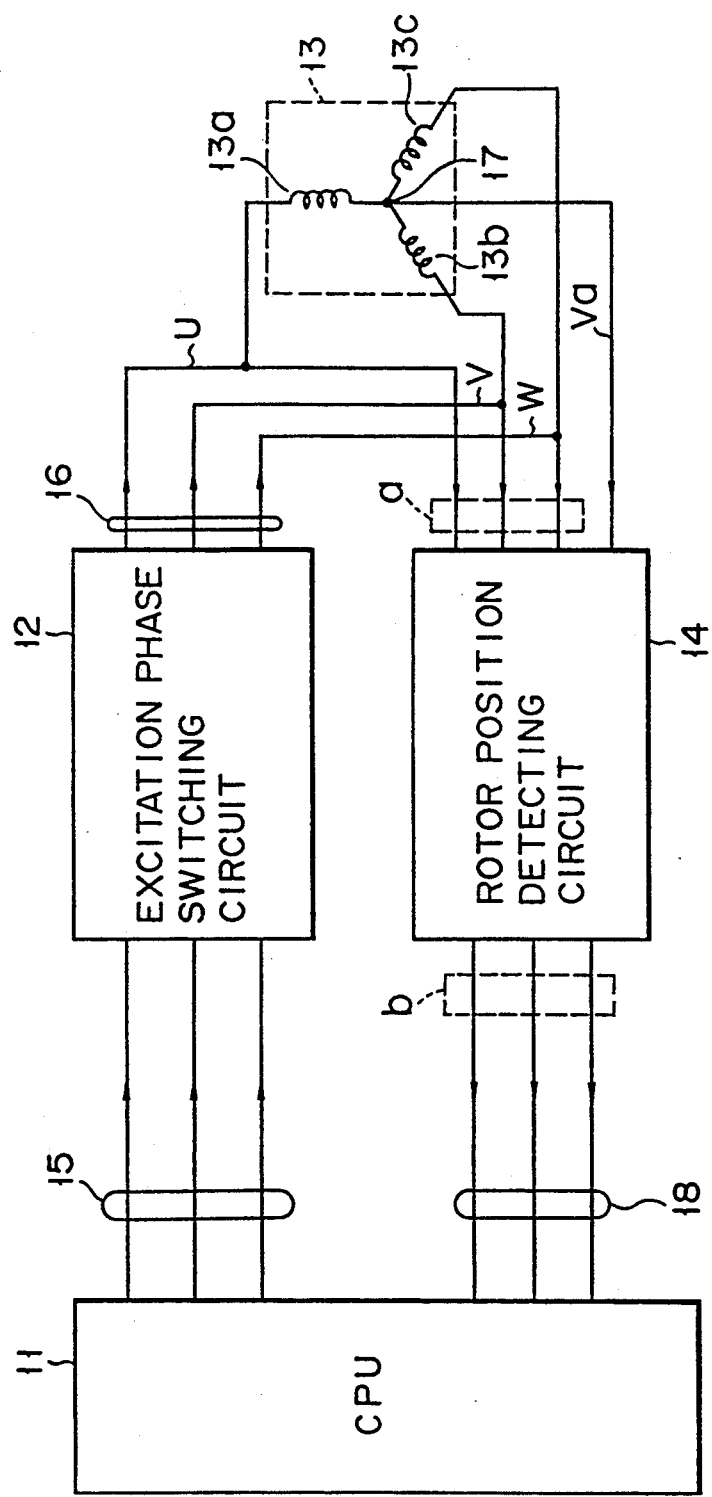
FIG. 1 is a block circuit diagram showing a sensorless and brushless DC motor control apparatus according to one embodiment of the present invention.

FIG. 1 is a block circuit diagram showing a sensorless and brushless DC motor control apparatus according to one embodiment of the present invention. As is shown in FIG. 1, the sensorless and brushless DC motor control apparatus comprises a CPU (central processing unit) 11, an excitation phase switching circuit 12, a sensorless and brushless DC motor 13 such as a sensorless spindle motor, and a rotor position detecting circuit 14.

The CPU 11 supplies a motor control signal 15 to the excitation phase switching circuit 12 so as to drive the sensorless and brushless DC motor 13.

Figure 2:
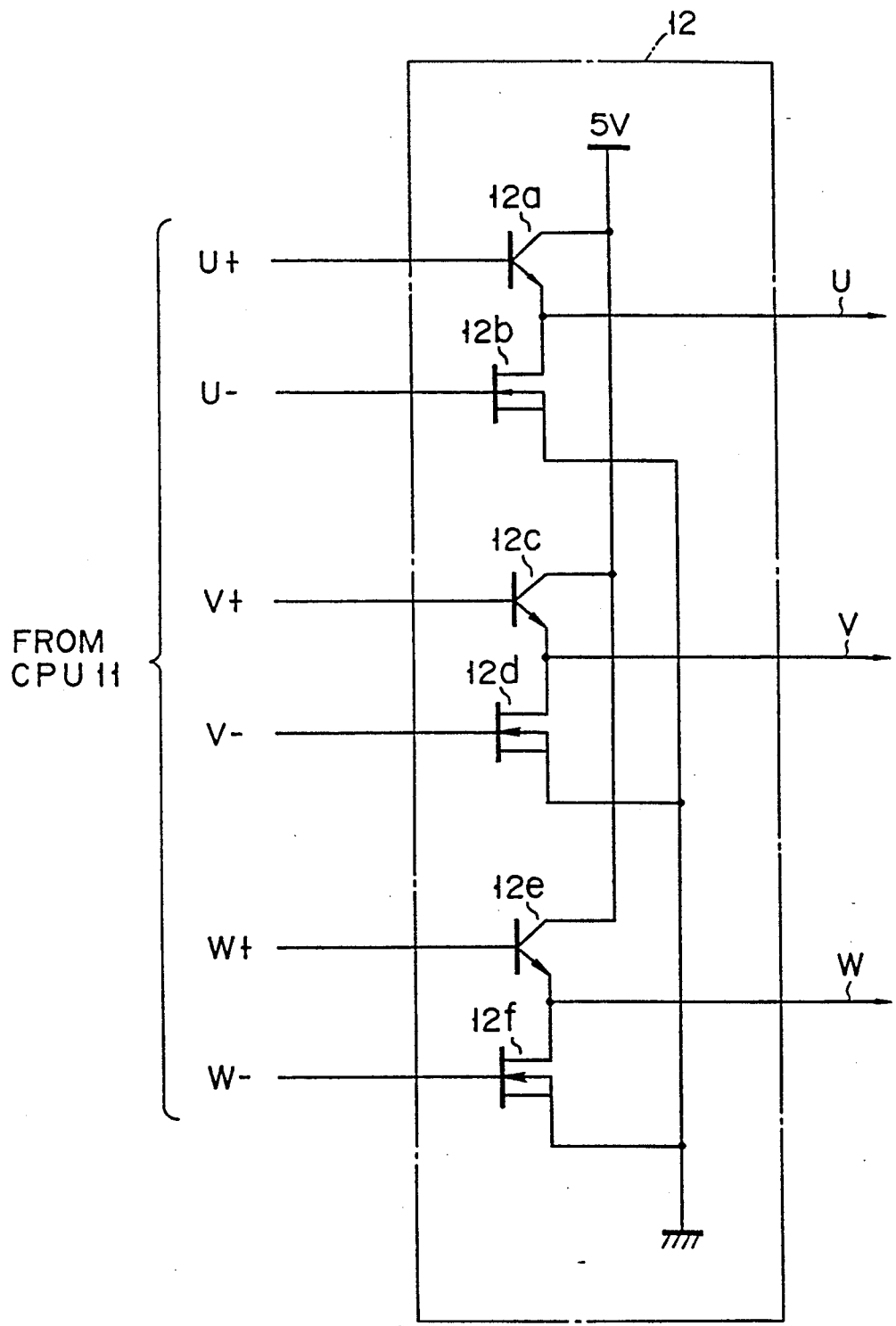
FIG. 2 shows the configuration of the excitation phase switching circuit employed in the sensorless and brushless DC motor control apparatus.

As is shown in FIG. 2, the excitation phase switching circuit 12 includes transistors 12a, 12c and 12e, and field effect transistors (FETs) 12b, 12d and 12f. The excitation phase switching circuit 12 produces a motor drive signal 16 in accordance with the motor control signal 15 supplied from the CPU 11, and supplies the motor drive signal 16 to both the sensorless and brushless DC motor 13 and the rotor position detecting circuit 14.

The sensorless and brushless DC motor 13 includes motor coils 13a, 13b and 13c of three phases (namely, a U phase, a V phase and a W phase). It also includes a rotor as described later (not shown in FIG. 1). In response to the motor drive signal 16 supplied from the excitation phase switching circuit 12, the motor coils 13a, 13b and 13c generate a magnetic field to rotate the rotor.

When the rotor is rotated, each of the motor coils 13a, 13b and 13c generates a back electromotive force. The back electromotive forces are superimposed on the motor drive signal 16, and the resultant signals are supplied to the rotor position detecting circuit 14. A common voltage Va generated in a common terminal 17 used in common to the motor coils 13a, 13b and 13c is also supplied to the rotor position detecting circuit 14.

Figure 3:
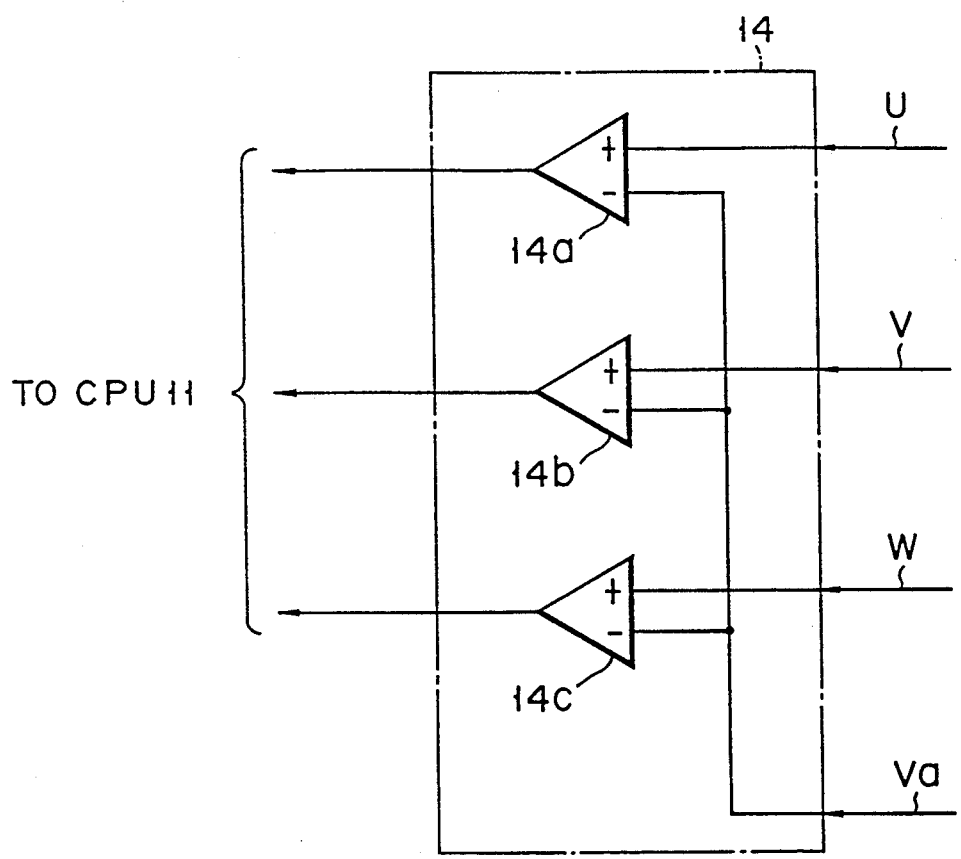
FIG. 3 shows the configuration of the rotor position detecting circuit employed in the sensorless and brushless DC motor control apparatus.

As is shown in FIG. 3, the rotor position detecting circuit 14 includes comparators 14a, 14b and 14c. Comparators 14a, 14b and 14c compare the common voltage Va with the back electromotive forces of motor coils 13a, 13b and 13c, respectively, and results of the comparison are supplied to the CPU 11 as rotor position signal 18.

On the basis of the rotor position signal 18 supplied from the rotor position detecting circuit 14, the CPU 11 determines the position of the magnetic pole of the rotor and supplies a motor control signal 15 to the excitation phase switching circuit 12. At the time of start of the sensorless and brushless DC motor 12, the rotor is positioned by exciting two of the three phases, and then the CPU 11 controls the switching of the excitation phase. After the sensorless and brushless DC motor 13 is started and the rotation of the rotor is accelerated, the CPU 11 calculates the suitable delay time on the basis of the rotor position signal 18, and supplies the motor control signal 15 to the excitation phase switching circuit 12 in accordance with the calculated suitable delay time.

Figure 4:
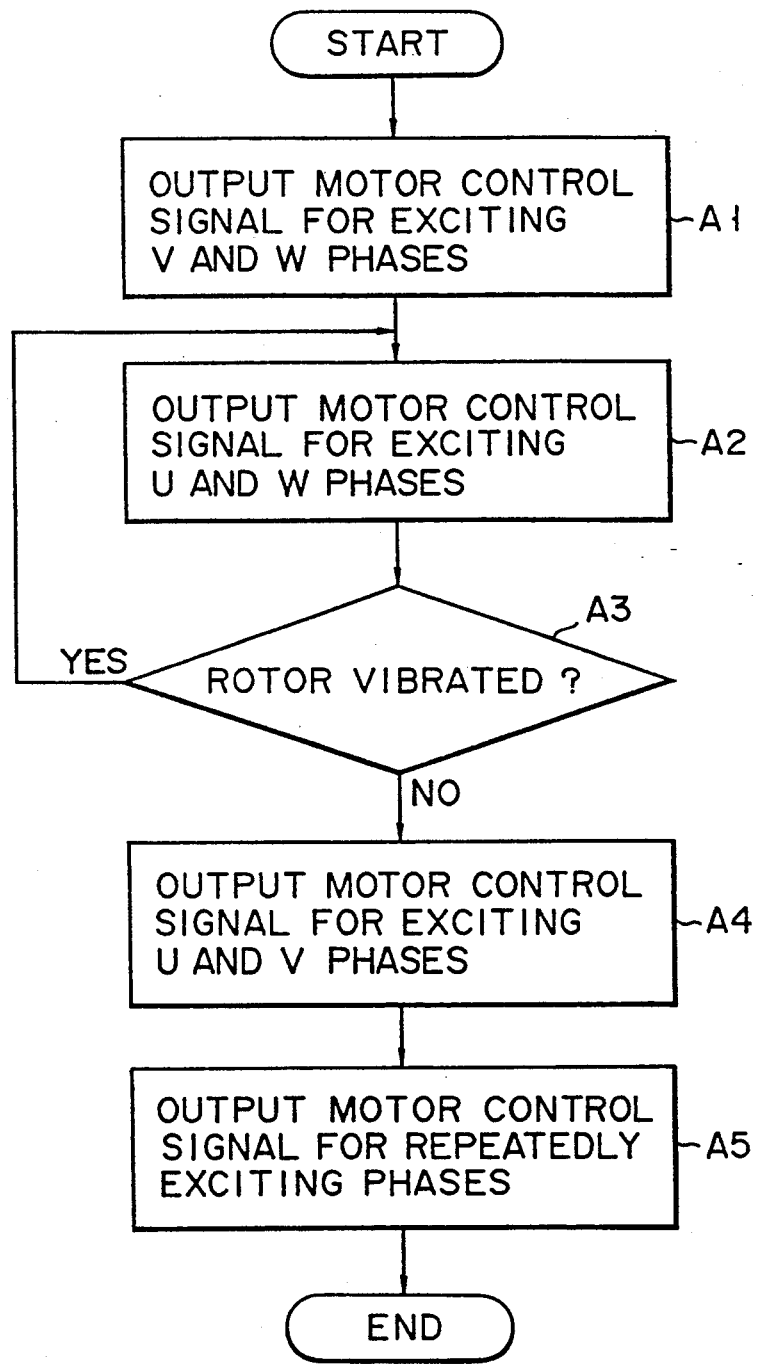
FIG. 4 is a flowchart explaining the rotation control of the rotor by a CPU at the time of starting a sensorless and brushless DC motor.

A description will now be given, with reference to the flowchart shown in FIG. 4, for the rotation control of the rotor at the time of starting the sensorless and brushless DC motor 13.

As mentioned above, in the case of the sensorless and brushless DC motor 13, the position of the magnetic pole of the rotor cannot be detected before the sensorless and brushless DC motor 13 is started. Thus, a motor control signal 15 used for exciting, e.g., the motor coils 13b and 13c corresponding to the V and W phases of the sensorless and brushless DC motor 13 is output in step A1. By this motor control signal 15, the rotor starts rotation.

Next, a motor control signal 15 used for exciting motor coils 13a and 13c corresponding to the U and W phases (i.e., the positioning phases) is output in step A2. By this motor control signal 15, the rotor is forced to position at the location corresponding to the U and W phases.

In the present invention, not the motor coils 13a and 13c corresponding to the U and W phases (i.e., the positioning phases) but the motor coils 13b and 13c corresponding to the V and W phases are initially excited at the time of starting the sensorless and brushless DC motor 13. The reason is as follows.

Figure 5:
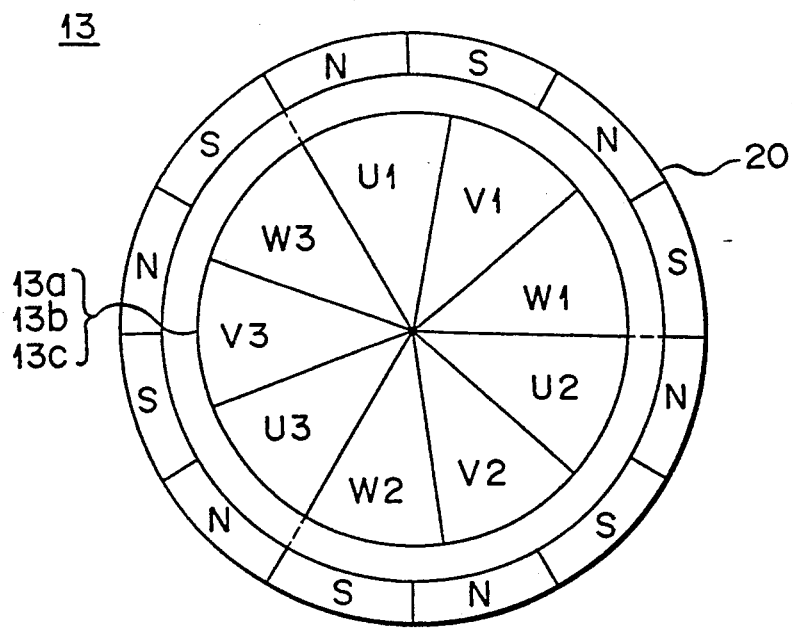
FIG. 5 shows a configuration of a sensorless and brushless DC motor having a rotor in the sensorless and brushless DC motor control apparatus.
Figure 6:
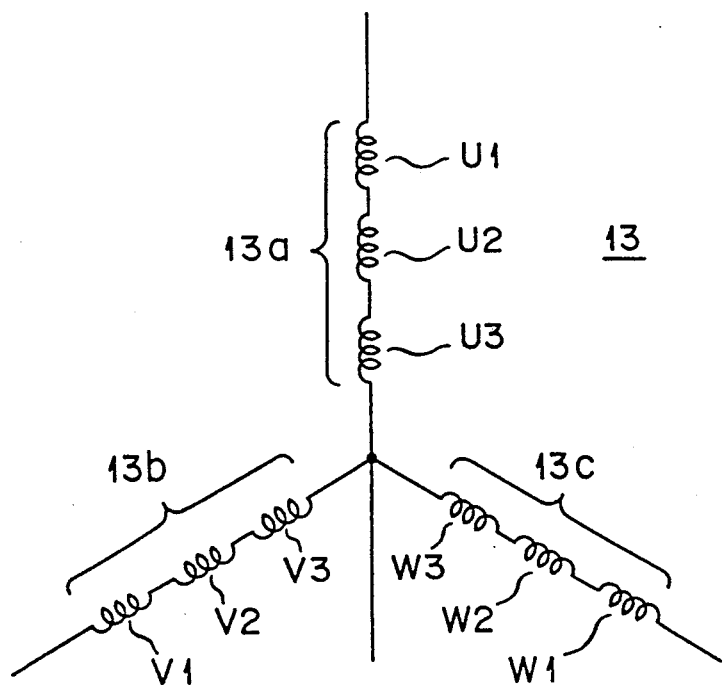
FIG. 6 shows a configuration of motor coils each having three coils in the sensorless and brushless DC motor.

In the embodiment, as shown in FIGS. 5 and 6, for example, the sensorless and brushless DC motor 13 includes a rotor 20 and motor coils 13a, 13b, and 13c. The rotor 20 to be rotated has 12 magnetic poles. On the other hand, the motor coil 13a has coils U1, U2, and U3, the motor coil 13b has coils V1, V2, and V3, and the motor coil 13c has coils W1, W2, and W3. When the U and W phases (positioning phases) are excited, i.e., when the coils U1, U2, U3, W1, W2, and W3 are excited in positions shown in FIG. 5, since the excited phases and positions of the magnetic poles are equal to each other, the rotor 20 cannot be rotated. Therefore, a position of the magnetic pole of the rotor 20 cannot be detected. In the present invention, therefore, phases other than the positioning phases are first excited, and then the positioning phases ar excited after the rotor starts rotation. According to this control, the rotor will be rotated in the direction opposite to the desired direction, depending upon the initial positions of the magnetic poles of the rotor. However, the angular range within which the magnetic poles may cause the rotor to rotate in the opposite direction is not more than ½ of the angular range in which the rotor rotates in accordance with one excitation. In the case where the rotor makes one rotation using six excitation patterns, the angular range within which the magnetic pole may cause the rotor to rotate in the opposite direction is 30° (=360°/6/2). The six excitation patterns are, U-W phase excitation, U-V phase excitation, W-V phase excitation, W-U phase excitation, V-U phase excitation, and V-W phase excitation, as described later. As long as desired magnetic poles of the rotor are not within this range, the rotor does not rotate in the opposite direction; it can rotate in the desired direction.

In the present invention, the rotor is positioned at the location corresponding to the U and W phases, because of the execution of steps A1 and A2. Since the rotor may vibrate when it is being positioned, it is checked in step A3 whether or not the rotor is vibrated. This check is made on the basis of the rotor position signal 18 output from the rotor position detecting circuit 14.

If it is determined in step A3 that the rotor is vibrated, the motor coils 13a and 13c corresponding to the U and W phases are kept excited until the vibration stops. That is, each of the motor coils 13a, 13b and 13c generates a back electromotive force when the rotor begins to rotate due to the execution of steps A1 and A2. In the rotor position detecting circuit 14, the back electromotive force generated in each motor coil is compared with the common voltage Va, and results of this comparison are supplied to the CPU 11 as the rotor position signal 18.

On the basis of the levels of the rotor position signal 18, the CPU 11 determines whether or not the rotor is vibrated. If the levels of the rotor position signal 18 are lower than a predetermined level, the CPU 11 determines that the rotor is not vibrated. After this determination, a motor control signal is output in step A4, so as to excite the motor coil 13a and 13b corresponding to the U and V phases. Thereafter, the motor control signal 15 is output in step A5 so as to repeatedly excite two of the U phase, V phase and W phase. That is, the excitation is repeatedly performed using the six excitation patterns. After the sensorless and brushless DC motor 13 keeps rotating in the desired direction, normal motor rotation control is performed.

As mentioned above, according to the present invention, the motor coils corresponding to phases other than the positioning phases are first excited, and then the motor coils corresponding to the positioning phases are excited, to thereby position the rotor at the time of starting the sensorless and brushless DC motor. Since the magnetic poles of the rotor can therefore be positioned at the desired locations, the sensorless and brushless DC motor can be driven in a stable state. In addition, the time required from the start of the rotation of the rotor to the achievement of the constant rotation of the rotor can be shortened. When the rotor is positioned according to the above embodiment of the present invention, the rotor will be rotated in the direction opposite to the desired direction, depending upon the positions of the magnetic poles of the rotor. However, since the rotor is rotated within a narrow angular range, e.g., 30° (in the case where the rotor makes one rotation using six excitation patterns), damage to the magnetic head, the recording medium, etc. can be reduced.

A description will be given, with reference to FIG. 7, of the timings of signals produced in the present apparatus.

Figure 7:
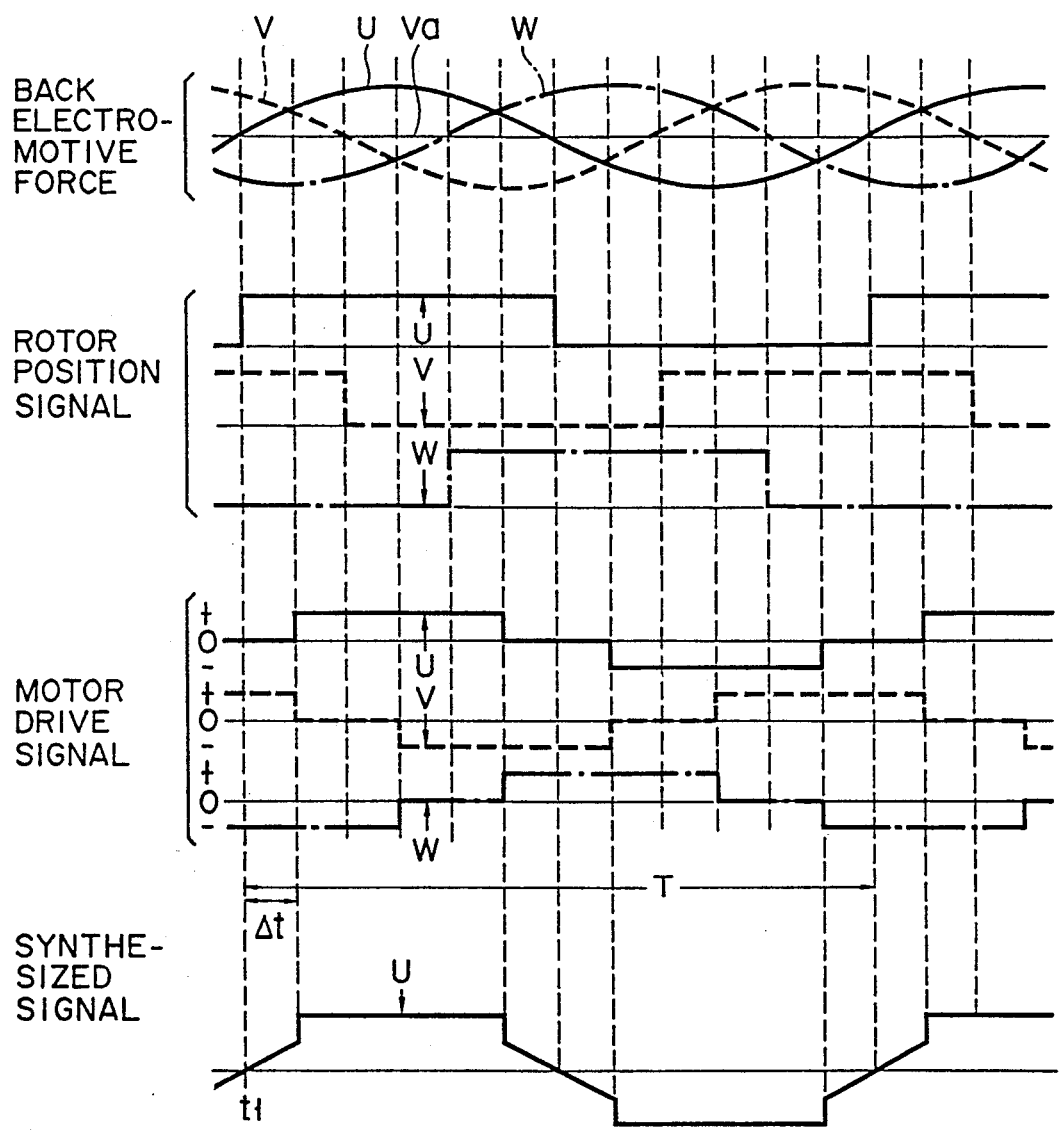
FIG. 7 shows the waveforms of a back electromotive force, a rotor position signal, a motor drive signal and a synthesized signal which are utilized in the embodiment.

FIG. 7 shows the waveforms of the following: the back electromotive forces produced in the motor coils 13a, 13b and 13c of the three phases (namely, the U, V and W phases), the common voltage Va, the rotor position signal 18 output from the rotor position detecting circuit 14, and the motor drive signal 16 which the excitation phase switching circuit 12 produces in response to the motor control signal 15 supplied from the CPU 11. In FIG. 7, symbol "+" denotes a power source voltage, "−" denotes a ground potential, and "0" denotes a central potential.

When the power source (not shown) of the present apparatus is turned on to drive the sensorless spindle motor 13, the CPU 11 outputs the motor control signal 15 used for driving the sensorless spindle motor 13 to the excitation phase switching circuit 12. In accordance with the motor control signal 15, the excitation phase switching circuit 12 switches the excitation phases. As a result, the sensorless spindle motor 13 is driven.

When the rotor begins to rotate, back electromotive forces of U, V and W phases, which have the phase difference of 120° from each other, are produced in the motor coils 13a, 13b and 13c, respectively. The back electromotive forces are detected by the rotor position detecting circuit 14, along with the common voltage Va. In the rotor position detecting circuit 14, the back electromotive forces of the motor coils 13a, 13b and 13c are compared with the common voltage Va, and rotor position signal 18 (FIG. 7) of the U, V and W phases, respectively, are output to the CPU 11 in accordance with the results of the comparison.

Figure 8:
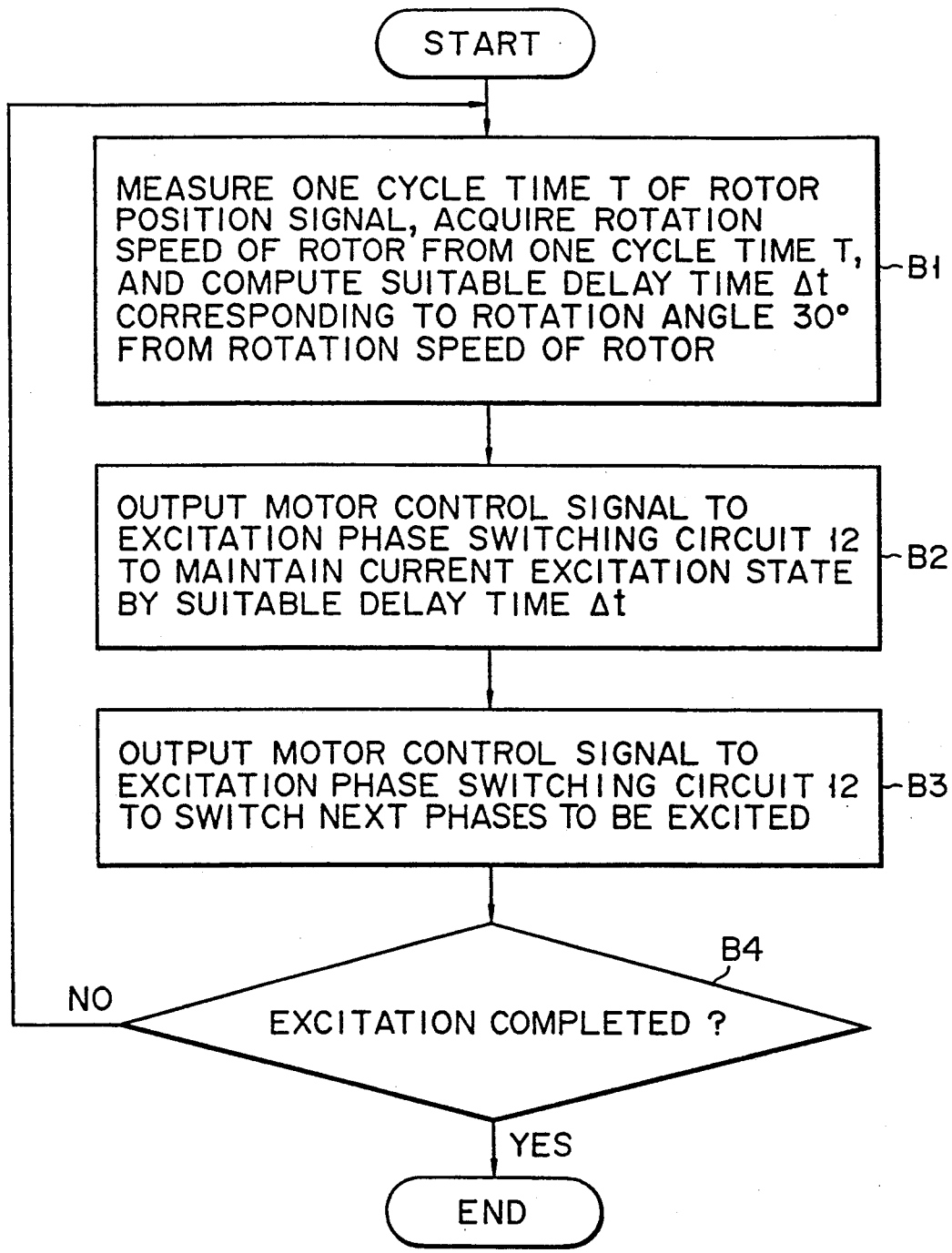
FIG. 8 is a flowchart explaining the rotation control of the rotor of the sensorless and brushless DC motor by the CPU.

According to the flowchart shown in FIG. 8, the CPU 11 produces the motor control signal 15 by the timing with a phase lag of 30°, corresponding to suitable excitation phase switching timing.

In step B1, for example, the one cycle time T (FIG. 7) of the U phase rotor position signal 18 is measured, and the rotation speed of the rotor is acquired from the measured one cycle time T. Further, a suitable delay time Δt corresponding to an angle of rotation of 30° is computed on the basis of the rotation speed of the rotor.

When the level of the rotor position signal 18 varies (i.e., when the level of the U phase rotor position signal 18 changes from low to high at time t1 in FIG. 7), after the computation of the suitable delay time Δt, the motor control signal 15 is supplied to the excitation phase switching circuit 12 (step B2), so as to maintain this excitation state of the sensorless and brushless DC motor 13 for the suitable delay time Δt. At the time, the power source voltage "+" is applied to the V phase, while the ground voltage "−" is applied to the W phase.

After the lapse of the suitable delay time Δt, the motor control signal 15 is supplied to the excitation phase switching circuit 12 in step B3, so as to excite next phases, i.e., the U and W phases. As a result, the excitation voltage of the U phase changes from the central voltage "0" to the source supply voltage "+", while the excitation voltage of the V phase changes from the power source voltage "+" to the central voltage "0".

In step B4, steps B1-B3 are repeated until the excitation is completed. Since, in this step, suitable delay times Δt are calculated for the V phase and W phase rotor position signals 18 as well, the excitation phases are always switched with a phase lag of 30° in accordance with the rotation speed of the rotor.

When the motor drive signal 16 from the excitation phase switching circuit 12 is supplied to the sensorless and brushless DC motor 13, the back electromotive forces of the motor coils 13a, 13b and 13c are superimposed on the motor drive signal 16. As a result, a synthesized signal such as that indicated in FIG. 7, is supplied to the rotor position detecting circuit 14. The synthesized signal is the signal obtained by superimposing the U phase excitation voltage on the back electromotive force of motor coil 13a.

With respect to the synthesized signal, it should be noted that the U phase is not excited at the portions where the waveform of the common voltage Va intersects the waveforms of the back electromotive forces of the motor coils 13a, 13b and 13c. From such portions, therefore, the back electromotive forces which are not influenced by the excitation voltage can be detected. Since, therefore, the rotor position signal 18 is stably supplied from the rotor position detecting circuit 14 to the CPU 11, the sensorless and brushless DC motor 13 can be controlled with high efficiency.

In the embodiment mentioned above, the switching timings of the excitation phases of the sensorless and brushless DC motor 13 are controlled by the CPU 11. However, the present invention is not limited to this. For example, a delay circuit may be arranged on either the input side a or the output side b of the rotor position detecting circuit 14, so as to provide a suitable delay time when the rotation of the rotor is steady. In the case where such a delay circuit is employed, the CPU 11 controls the suitable delay time at the time of start of the sensorless and brushless DC motor 13, and the delay circuit provides a predetermined delay time after the rotation of the rotor becomes steady. With this control, it is possible to reduce the load applied to the CPU 11 when the rotation of the rotor is steady.

As has been described, in the sensorless and brushless DC motor, the excitation phases can be switched in a suitable manner at all times, in accordance with the rotation speed of the rotor. Therefore, the sensorless and brushless DC motor can be started with high efficiency, and the power consumption of the sensorless and brushless DC motor can be reduced, accordingly.

Further, though two phases are excited in one excitation in the embodiment, one phase can be excited in one excitation. That is, for example, only U phase is excited and then V phase is excited, W phased is excited after V phase excitation.

Additional advantages and modifications will readily occur to those skilled in the art. Therefore, the invention in its broader aspects is not limited to the specific details, and representative devices shown and described herein. Accordingly, various modifications may be made without departing from the spirit o scope of the general inventive concept as defined by the appended claims and their equivalents.

What is claimed is:

1. A sensorless and brushless DC motor control apparatus comprising:

a sensorless and brushless DC motor having a rotor and a plurality of phase coils, the rotor having a plurality of magnetic pole positions;

excitation means for exciting a pair of phase coils from the plurality of phase coils to rotate the rotor;

detection means for detecting a magnetic pole position of the rotor from a back electromotive force produced in the excited phase coils; and control means for controlling the excitation means in accordance with the detected magnetic pole position, and wherein at activation of the sensorless and brushless DC motor, the control means controls the excitation means to excite one pair of phase coils to rotate the rotor and then to excite another pair of phase coils to position the magnetic pole position in another pair of phase coils, and the control means determines whether or not the rotor vibrates in accordance with the detected magnetic position when the rotor starts to rotate.

2. The apparatus according to claim 1, wherein when a level of a rotor position signal corresponding to the detected magnetic pole position is less than a desired level, the control means determines the rotor does not vibrate.

3. The apparatus according to claim 1, wherein another pair of phase coils to be positioned are excited by the excitation means continuously during the vibration of the rotor.

4. A sensorless and brushless DC motor control apparatus comprising:

a sensorless and brushless DC motor having a rotor and a plurality of phase coils;

excitation means for exciting a pair of phase coils from the plurality of phase coils to rotate the rotor;

detection means for detecting a magnetic pole position of the rotor from a back electromotive force produced in the excited phase coils; and control means for controlling the excitation means in accordance with the detected magnetic pole position, and wherein at activation of the sensorless and brushless DC motor, the control means controls the excitation means to excite one pair of phase coils to rotate the rotor and then to excite another pair of phase coils to position the magnetic pole position in another pair of phase coils, and the control means determines whether or not the rotor vibrates in accordance with the detected magnetic pole position when the rotor starts to rotate and controls the excitation means to excite a desired pair of phase coils outside another pair of phase coils when the rotor does not vibrate.

5. The apparatus according to claim 4, wherein when a level of a rotor position signal corresponding to the detected magnetic pole position is less than a desired level, the control means determines the rotor does not vibrate.

6. The apparatus according to claim 4, wherein another pair of phase coils to be positioned is excited by the excitation means continuously during vibration of the rotor.

7. A sensorless and brushless DC motor control apparatus comprising:

a sensorless and brushless DC motor having a rotor and a plurality of phase coils;

excitation means for exciting a pair of phase coils from the plurality of phase coils to rotate the rotor;

detection means for detecting a magnetic pole position of the rotor from a back electromotive force produced in the excited phase coils; and wherein on activation of the sensorless and brushless DC motor, the control means controls the excitation means to excite one pair of phase coils to rotate the rotor and then to excite another pair of phase coils to position the magnetic pole position in another pair of phase coils, and the control means determines whether or not the rotor vibrates in accordance with the detected magnetic pole position when the rotor starts to rotate and controls the excitation means to stop excitation of a desired pair of phase coils outside another pair of phase coils until the rotor does not vibrate.

8. The apparatus according to claim 7, wherein a level of a rotor position signal corresponding to the detected magnetic pole position is less than a desired level, the control means determines the rotor does not vibrate.

9. The apparatus according to claim 7, wherein another pair of phase coils to be positioned is excited by the excitation means continuously during vibration of the rotor.

* * * * *